United States Patent [19]

Benjamin

[11] 4,320,693
[45] Mar. 23, 1982

[54] ADJUSTMENT FOR CARBURETOR CONTROL DEVICES

[75] Inventor: Benjamin C. Benjamin, Flint, Mich.

[73] Assignee: Schmelzer Corporation, Flint, Mich.

[21] Appl. No.: 200,560

[22] Filed: Oct. 23, 1980

Related U.S. Application Data

[63] Continuation of Ser. No. 56,079, Jul. 9, 1979, abandoned, which is a continuation of Ser. No. 848,317, Nov. 3, 1977, abandoned.

[51] Int. Cl.³ .................. F01B 31/14; F15B 15/24
[52] U.S. Cl. .................. 92/13.6; 92/13.2; 411/82; 411/377
[58] Field of Search .................. 92/13.2, 13.6; 151/41.7, 41.73, 2 R, 44, 54; 85/54

[56] References Cited

U.S. PATENT DOCUMENTS

| 525,431 | 9/1894 | Sparks | 151/54 |
| 1,296,165 | 3/1919 | Costuma | 151/54 |
| 2,648,367 | 8/1953 | Curran | 151/54 |
| 2,726,009 | 12/1955 | Murdock, Sr. | 85/1 JP |
| 3,145,752 | 8/1964 | Dupree | 151/41.7 |
| 3,237,917 | 3/1966 | Kunzer | 85/54 |
| 3,425,313 | 2/1969 | Villo | 151/54 |
| 3,437,118 | 4/1969 | Coyle | 151/7 |
| 4,033,232 | 7/1977 | Benjamin | 92/13.6 |

FOREIGN PATENT DOCUMENTS

273907 7/1927 United Kingdom .................. 151/54
790051 2/1958 United Kingdom .................. 85/54

OTHER PUBLICATIONS

IBM Technical Disclosure Bulletin, Heat-Shrunk Plastic Attachments, vol. 9, No. 3, Aug. 1966, pp. 311–312.

*Primary Examiner*—Abraham Hershkovitz
*Attorney, Agent, or Firm*—Fisher, Gerhardt, Crampton & Groh

[57] ABSTRACT

An arrangement for adjustments on carburetor control devices by which the adjustment is sealed to prevent unauthorized readjustment, leakage or accidental movement out of adjustment by the use of a heat shrinkable tube or cap shrunk into contact with both the adjustment and associated structure to prevent relative movement.

3 Claims, 5 Drawing Figures

ADJUSTMENT FOR CARBURETOR CONTROL DEVICES

This application is a continuation of application Ser. No. 056,079, filed July 9, 1979 now abandoned, which is a continuation of application Ser. No. 848,317, filed Nov. 3, 1977, now abandoned.

This invention relates to carburetor control devices and particularly to adjustments on such devices which are tamper proof, leak proof and locked in adjusted position.

Carburetors for use with the internal combustion engines on automobiles have various adjustments and controls which require adjustment. For example, vacuum break devices in the form of servo motors are used in conjunction with carburetors to open the automatic choke valve immediately after starting to prevent the engine from stalling. The amount that the choke valve can be opened on various models of engines and type of vehicles varies and usually is adjusted to some preselected position at the time of manufacture. Once such adjustment is made it is desirable that it be accurately maintained and not subject to change due to vibration of the engine or tampering by unauthorized or inexperienced mechanics. Moreover, control devices such as vacuum breaks are operated by pressure differentials and adjusting devices such as adjusting screws may pass through walls subject to differential pressure and therefore are subject to leakage.

Adjustment of control devices such as vacuum break servo motors are necessary because the same device may be used on different carburetors, different engines or different vehicles and it is desirable to provide means to adjust the vacuum break to permit one device to be used in varying applications.

It is an object of the present invention to provide a vacuum break device having an adjustment which can be locked in its adjusted position.

Still another object of the invention is to provide a vacuum break device with an adjustment which may be sealed against leakage.

Another object of the invention is to provide an adjustment for vacuum break devices which may be made tamper-proof after the adjustment has been made.

An adjustment for a vacuum break device or the like is provided wherein a longitudinally adjustable screw is supported in a mounting member to receive a tube or cap of heat shrinkable material. The material is shrunk into position to engage the irregular surfaces of both the adjusting screw and the associated structure to prevent relative rotation, leakage of air through the adjustment structure and to prevent either accidental or deliberate rotation of the parts relative to each other.

These and other objects and advantages of this invention will be apparent from the following description and from the accompanying drawings in which.

Figure 1:
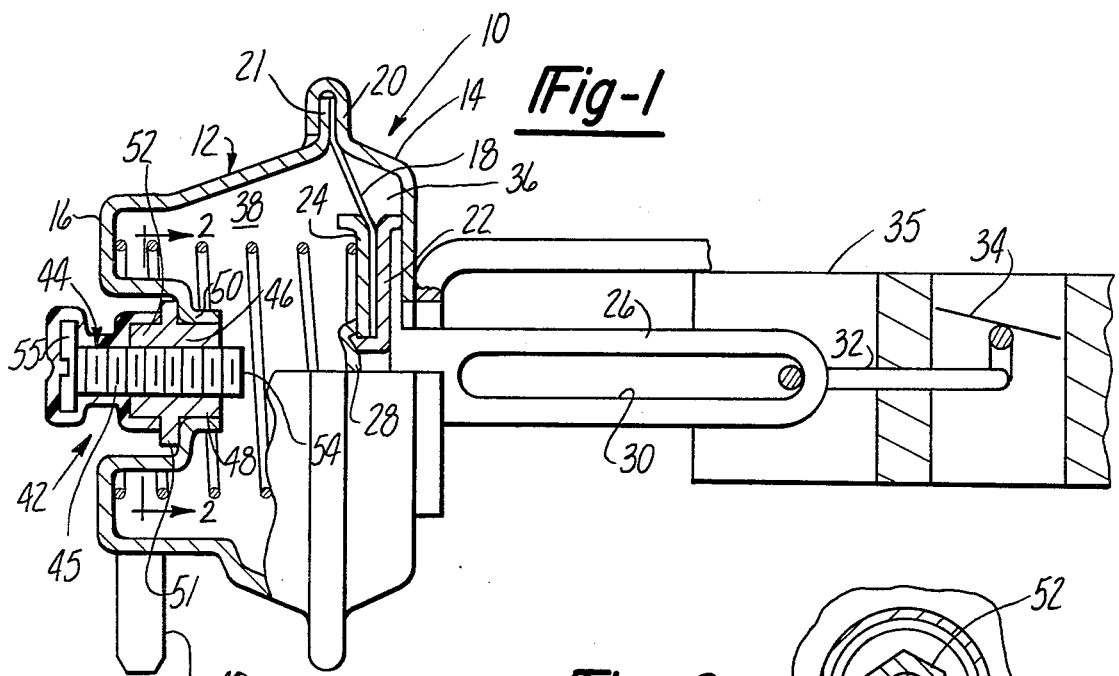
FIG. 1 is a sectional view of a vacuum break device incorporating the adjusting feature of the present invention.
Figure 2:
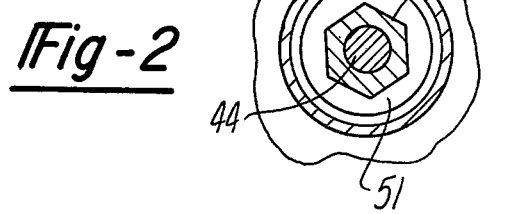
FIG. 2 is a cross-sectional view taken on line 2—2 in FIG. 1.

Referring now to the drawings, a vacuum break or servo motor 10 includes a housing 12 made up of a pair of generally cup-shaped front and back covers 14 and 16, respectively. A flexible diaphragm 18 has its outer periphery clamped between peripheral flanges 20 and 21 of the front and rear covers 14 and 16.

A central portion of the diaphragm 18 is provided with front and rear backing plates 22 and 24 which are held together in clamping relationship to the diaphragm by means of a plunger 26 which is upset as indicated at 28. The opposite end of the plunger 26 passes through an opening in the front cover 14 and is provided with a slot 30 to receive a control rod 32 connected to a choke valve 34 forming part of the carburetor.

The diaphragm 18 provides the interior of the housing 12 into a forward chamber 36 and a rearward chamber 38. The forward chamber 36 is in continuous communication with the atmosphere by way of the opening through the front cover 14 through which the plunger 26 passes. The rearward chamber 38 is subject to variable pressure and communicates by way of the inlet 40 a source of vacuum such as the intake manifold of an internal combustion engine, not shown. When the engine is started, air at atmospheric pressure in the chamber 38 is replaced by vacuum and as a result of the differential in pressures in the forward and rearward chambers 36 and 38, the plunger 26 is moved to the left as viewed in the drawings to open the choke valve 34.

The stroke of the plunger 26 or the extent of movement to the left as viewed in FIG. 1 is limited by an adjustment mechanism designated in its entirety at 42. The adjustment includes an adjustment screw 44 having a threaded shank 45 threadably engaged in a collar member 46 having a tubular portion 48 press fit into an opening formed by an angular flange 50. The collar 46 also includes a radial extending flange 51 and an irregularly shaped boss 52 which in the present instance is formed in the shape of a hexagon. The adjustment screw 44 is rotated to move the screw axially to change the position of the end 54 which engages the upset portion 28 of the diaphragm assembly to limit stroke of the vacuum break unit.

After the appropriate setting of the vacuum break unit is achieved by positioning the adjusting screw 44 to determine the maximum opening of the choke valve, the exposed head 55 and threads at the exterior of the housing 12 as well as the boss 52 are encapsulated in heat shrinkable plastic material.

Figure 3:
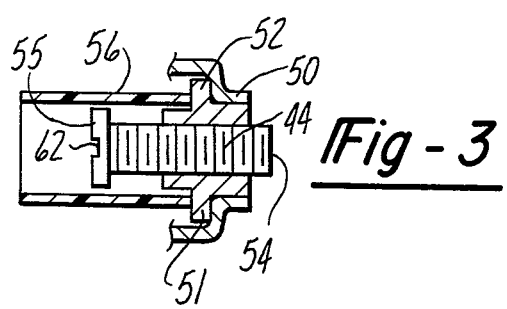
FIG. 3 is a cross-sectional view of a portion of the structure seen in FIG. 1 with a plastic tube in position ready for shrinking.
Figure 4:
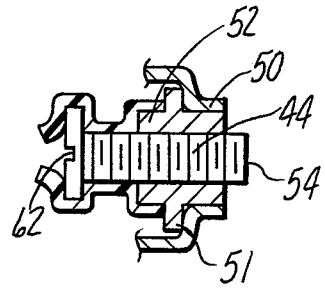
FIG. 4 is a view similar to FIG. 3 showing the condition of the part after the tube has been shrunk.
Figure 5:
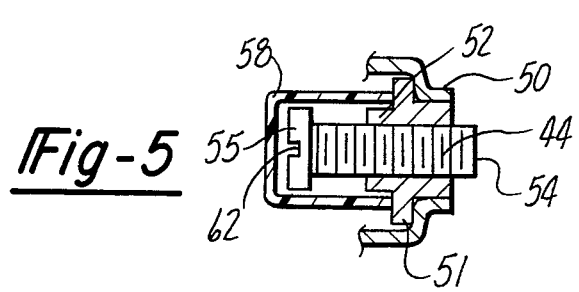
FIG. 5 is a view similar to FIG. 3 showing a cap in position ready for shrinking.

After the screw adjustment is completed, a tube 56 of heat shrinkable material as shown in FIG. 3 or a cap 58 as shown in FIG. 5 are slipped over the adjustment screw 44 and the boss 52. For this purpose the internal diameter of the tube 56 and cap 58 are slightly larger than the major dimension of the screw head 55 or of the boss 52. Subsequently the tube 56 or cap 58 may be shrunk by the application of heat or the like so that they grip the boss 52, the exposed threads of the adjustment screw 44 and the screw head 55 as shown in FIGS. 1 and 4.

The tube 56 and cap 58 can be of any suitable shrinkable plastic of which there are a variety of examples. One material for example, is mechanically expanded polyethylene which has a plastic memory. Such material will shrink when heated tending to recover its original dimensions prior to expansion. Upon heating and consequent shrinking, the tube 56 and cap 58 will tightly clamp the boss 52 and the screw head 55 as well as the exposed threads therebetween provided that the internal diameter of the tube 56 and cap 58 are less than the external diameter of the screw prior to the time that the tube or cap are expanded. Still other shrinkable materials may be used which also shrink upon application of heat or upon removal of the swelling agent or which shrink upon exposure to air.

It will be noted that with either the tube 56 or cap 58 shrunk into place on the adjusting screw 44, that a tool such as a screwdriver, not shown, would not be effectively engaged in the slot 62 in the screw head 55 so that unauthorized adjustment would not be easily achieved. Also the tight engagment of the shrinkable tube 56 and cap 58 with the irregular surface of screw head 55 and the irregular surface of boss 52 prevents relative rotation and loosening of the screw 44. The same gripping action acts as a fluid seal around the threads of the screw and eliminates the need for o-rings or other seals since the shrunk plastic material tightly engages the contained surfaces and prevents atmospheric air from entering the rearward chamber 38 during operation of the servo motor 10.

A lock and seal arrangement for adjustable control devices such as those used on carburetors has been provided in which the adjusting member is threaded into a mounting member and both the threaded member and the mounting member have irregular surfaces which are engaged by the tube or tubular cap of heat shrinkable material so that the members are prevented from rotating relative to each other, so that access to make adjustment to the member is obstructed and so that the adjustable member is sealed relative to its supporting structure to prevent the leakage of air.

The embodiments of the invention in which an exclusive property or privilege is claimed are defined as follows:

1. A reciprocating vacuum operated servo motor having a housing, a stop member disposed in and extending through a wall of said housing for limiting the stroke of said servo motor, a boss formed on an exterior wall of said housing and forming a threaded opening communicating with the interior of said housing and having an irregular radial outer surface, said stop member being threadably engaged with said boss, a tool receiving portion having an irregular surface formed at one end of said stop member and being disposed at an exterior side of said wall, and a lock member of heat shrinkable plastic material in common sealing engagement with said tool receiving portion and a portion of the threaded portion of said stop member and also with said irregular surface of said boss at an exterior of said housing to obstruct access to said tool receiving portion and prevent fluid leakage and relative axial or rotational movement between said stop member and said boss.

2. The combination of claim 1 in which the member of heat shrinkable plastic material is in the form of a tube having an internal diameter larger than the diameter of said adjustable member or the diameter of said boss, and having a length greater than the length of the portion of said adjustable member projecting from said boss.

3. The combination of claim 1 in which said member is a tubular cap having a closed end and being disposable on said adjustable member and said boss.

* * * * *